United States Patent
Tranquilla

[11] Patent Number: 6,000,693
[45] Date of Patent: Dec. 14, 1999

[54] ARTICLE DETECTION VIA PINCH-ROLL MOTION

[75] Inventor: Michael N. Tranquilla, Livonia, Mich.

[73] Assignee: Unisys Corporation, Blue Bell, Pa.

[21] Appl. No.: 08/752,859

[22] Filed: Nov. 20, 1996

Related U.S. Application Data

[60] Provisional application No. 60/008,214, Dec. 5, 1995.

[51] Int. Cl.⁶ .................................................. B65H 7/02
[52] U.S. Cl. .................... 271/263; 271/265.04; 271/274; 324/229
[58] Field of Search ................. 271/265.04, 262, 271/263, 273, 274, 258.01, 259, 265.01, 265.02; 324/207.16, 207.26, 229

[56] References Cited

U.S. PATENT DOCUMENTS

| | | | |
|---|---|---|---|
| 2,637,552 | 5/1953 | Watson | 271/262 |
| 3,731,916 | 5/1973 | Pettet | 271/263 |
| 3,803,482 | 4/1974 | Steingroever | 324/230 |
| 3,806,112 | 4/1974 | Melby et al. | 271/10.13 |
| 3,826,487 | 7/1974 | Forster et al. | 271/263 |
| 3,846,771 | 11/1974 | Young et al. | 324/207.19 |
| 4,339,953 | 7/1982 | Iwasaki | 324/208 |
| 4,550,252 | 10/1985 | Tee | 271/263 |
| 4,710,257 | 12/1987 | Mattei et al. | 271/276 |
| 4,753,433 | 6/1988 | Rodi et al. | 271/263 |
| 5,011,128 | 4/1991 | Tsuji | 271/265.04 |
| 5,029,837 | 7/1991 | Uchiyama | 271/263 |
| 5,712,804 | 1/1998 | Elbling | 271/262 |

FOREIGN PATENT DOCUMENTS

| | | | |
|---|---|---|---|
| 225228 A2 | 6/1987 | European Pat. Off. | 271/263 |
| 60-112548 | 6/1985 | Japan | 271/262 |
| 2-169438 | 6/1990 | Japan | 271/262 |
| 6-32495 | 2/1994 | Japan | 271/262 |

Primary Examiner—Robert P. Olszewski
Assistant Examiner—Thuy V. Tran
Attorney, Agent, or Firm—Rocco L. Adornato; Mark T. Starr; John J. McCormack

[57] ABSTRACT

A system can detect leading and trailing edges of documents, and document thickness with a single transducer. The transducer operates to measure the displacement of an idler pinch roller by a passing document.

1 Claim, 3 Drawing Sheets

PINCH ROLLER & TRANSDUCER ASSEMBLY

PINCH ROLLER & TRANSDUCER ASSEMBLY

BLOCK DIAGRAM OF TRANSDUCER ELECTRONICS

ELECTRICAL SIGNALS

EXAMPLE OF IDLER ARM, ROLLER & SENSOR ASSEMBLY

ARTICLE DETECTION VIA PINCH-ROLL MOTION

This is a Continuation of my Provisional application U.S. 60/008,214 for Article Detection via Pinch Roll Motion, filed in U.S. PTO on Dec. 5, 1995, and for which I herewith claim priority under 35 USC.

This relates to pinch-roll arrays for transporting articles, and particularly to such where article condition/movement is detected according to how much an idler roll is displaced.

BACKGROUND, FEATURES

Workers in the item-transport arts are aware of the need for better means to monitor item-movement for instance, such can now be commonly done with optical sensors placed in the item path and used to detect leading and trailing edges of a passing item. But such optical sensors would not be used to measure document thickness. Document thickness information is useful for the employment of downstream "smart" devices that can adjust their parameters so that documents are handled more reliably. Such optical sensors can be located in the guide-walls of a transport track—but, there, they can catch leading edges of documents and cause jams, and/or they can malfunction because of paper dust collecting on them.

This invention is directed toward alleviating the foregoing difficulties. This invention is not sensitive to paper dust; e.g., because it uses idler-monitoring transducer (sensor) means that is not interposed in the document transport path, and because such can be totally enclosed protectively (e.g., by different means known to those familiar with the art). With such an idler-monitoring sensor (not located in the document path), the risk of document jam is reduced or eliminated, and reliable document handling is promoted.

"Idlers" (Idler pinch rollers) are commonly used in document transports in conjunction with a fixed drive roller (e.g., as in FIG. 1). A passing document will thrust an idler roller transversely (i.e., normal to the document transport path) to accommodate various document thicknesses. An object hereof is to operatively associate such an idler roll with a pivot arm and related detector (sensor) means to detect the degree of arm-displacement caused by a passing document; e.g., doing so to obtain various data about the passing document from such a detector (i.e. sensor for "idler transducer"); also, desirably one can locate such a transducer well out of the document path, and can employ a variety of different kinds of transducers to sense such arm-displacement. In this way, this invention will not rely on detect means to directly sense the presence or condition of a document; also, the electrical output from such a transducer can be used to measure document thickness and to detect passage of its leading and trailing edges.

A system according to this invention can detect leading and trailing edges of documents, and document thickness, with a single transducer. Also, various electrical utilization circuits can use the electrical output of the transducer for indicating document presence and/or condition. Such a transducer can operate very simply and reliably, merely measuring the displacement of an idler pinch roller by a passing document.

This invention takes advantage of elements that already exist and uses this idler-displacement as information that can be processed to obtain additional information about the document: e.g., location of leading and trailing edges, length of document, document thickness, interdocument spacing, etc. Worker will realize that this invention can be used for document sorters, mail sorters, copiers, punch card transports, envelope stuffing machines, money feeders, and automatic teller machines.

Thus, another object is to alleviate at least some of the foregoing problems and effect at least some of the foregoing results. A related object is to do so for an set of transport rollers used to advance documents or the like; especially where an idler roll is mounted on mount means whose displacement may be monitered to indicate document size, condition, etc.

BRIEF DESCRIPTION OF THE DRAWINGS

These and other features and advantages of the present invention will be appreciated by workers as they become better understood by reference to the following detailed description of the present preferred embodiments which should be considered in conjunction with the accompanying drawings, wherein like reference symbols denote like elements:

FIG. 3 indicates related detect-signals; while

DETAILS OF PREFERRED EMBODIMENTS

The methods and means discussed herein will generally be understood as constructed and operating as presently known in the art, except where otherwise specified; likewise all materials, methods, devices and apparatus described herein will be understood as implemented by known expedients according to present good practice.

Figure 1:
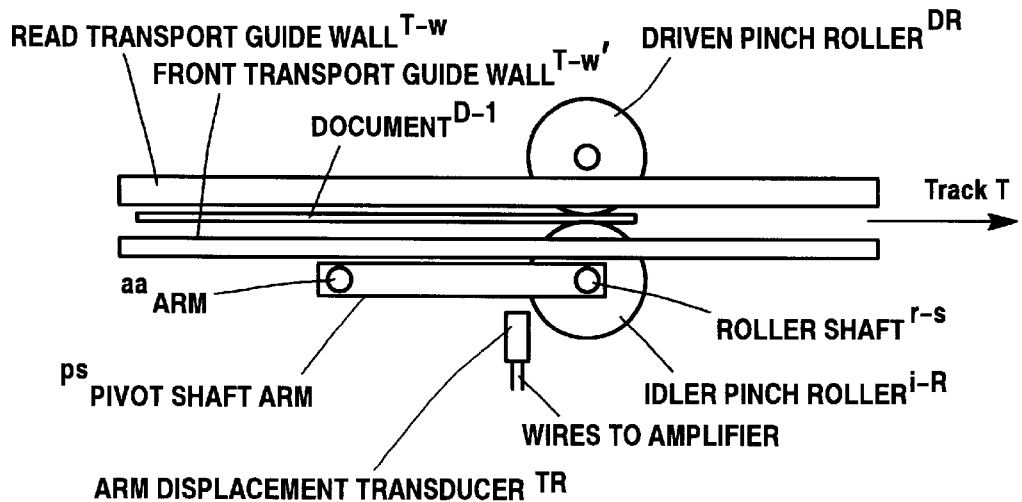
FIG. 1 is a side view of schematic idealized configuration embodying this invention.

Referring to FIG. 1, it is assumed that documents are transported down a track T (see arrow) by transport means known to those familiar with the state of the art. This invention will work with any number of these transport systems: e.g., with rollers, belts, vacuum belts, electrostatic belts, etc., and combinations of these. Systems that don't already have idler pinch rollers (such as vacuum belts), can still have idler pinch rollers added.

Track T is defined by conventional rear/front sidewalls T-w,T-w' and a base surface (not shown), with the documents (e.g., checks in a high-speed check processor/imager) engaged in the nip between a fixed drive-roller DR and an opposed idler roller i-R which, preferably and conventionally is spring-biased to be urged toward drive roller DR (means not shown but well understood in the art).

"Idler" i-R is mounted and monitored so that its displacement can be used to determine the size, thickness and condition, etc. (e.g., thickness abnormalities) of each document passing the nip between DR and i-R—and do so as it passes. Thus, roller i-R is, here, preferably mounted for rotation on a shaft r-s affixed on the distal end of a pivot arm aa which is pivoted (e.g., on shaft ps), so that (the degree of) arm displacement can be detected by an associated sensor-transducer, or detector unit TR. The electrical output from TR will be understood as used (e.g., as indicated in FIGS. 2,3) to determine characteristics (e.g., thickness) of a passing document then in the nip between DR and i-R.

Thus, the thickness of a passing document D-1 can be measured when it forces idler i-R "open" (transverse the direction of document transport which is, left-to-right in FIG. 1—see arrow). The idler roller shaft r-s is connected to arm aa which is pivoted about arm pivot shaft "PS fixed to the transport frame, so the arm aa will undergo angular displacement about its pivot shaft PS". This arm motion is detected by sensor TR which converts various shifts in mechanical position into various associated electrical outputs. Examples of such sensors are eddy current sensors, variable capacitance sensors. Also, less preferably, optical sensors like reflected light sensors, optical switches, etc., known to those skilled in the art of position detection may be used. After the document leaves the nip, arm aa is urged back, preferably by a suitable return spring (not shown but known in the art).

Figure 4:
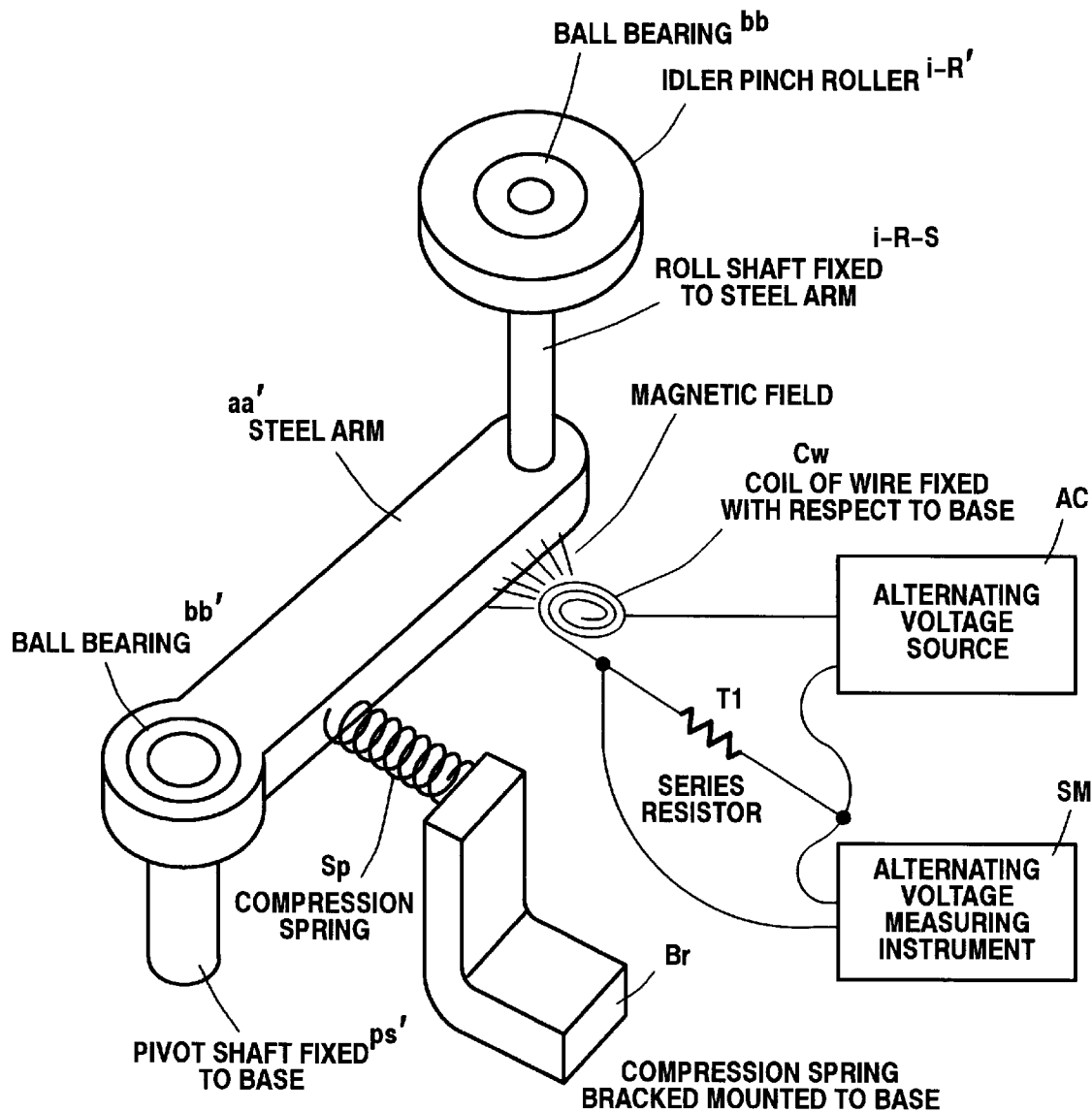
FIG. 4 shows in perspective some details of elements of FIG. 1.

FIG. 4, described below, shows further details of such an embodiment.

Figure 2:
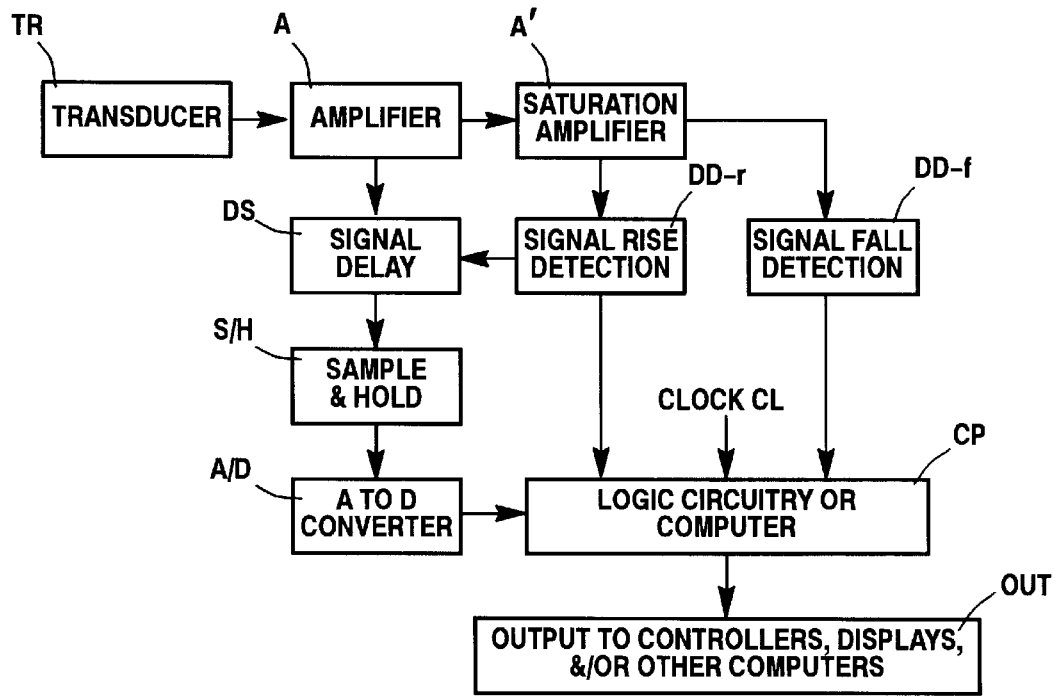
FIG. 2 is a block diagram of a related detector system.
Figure 3:
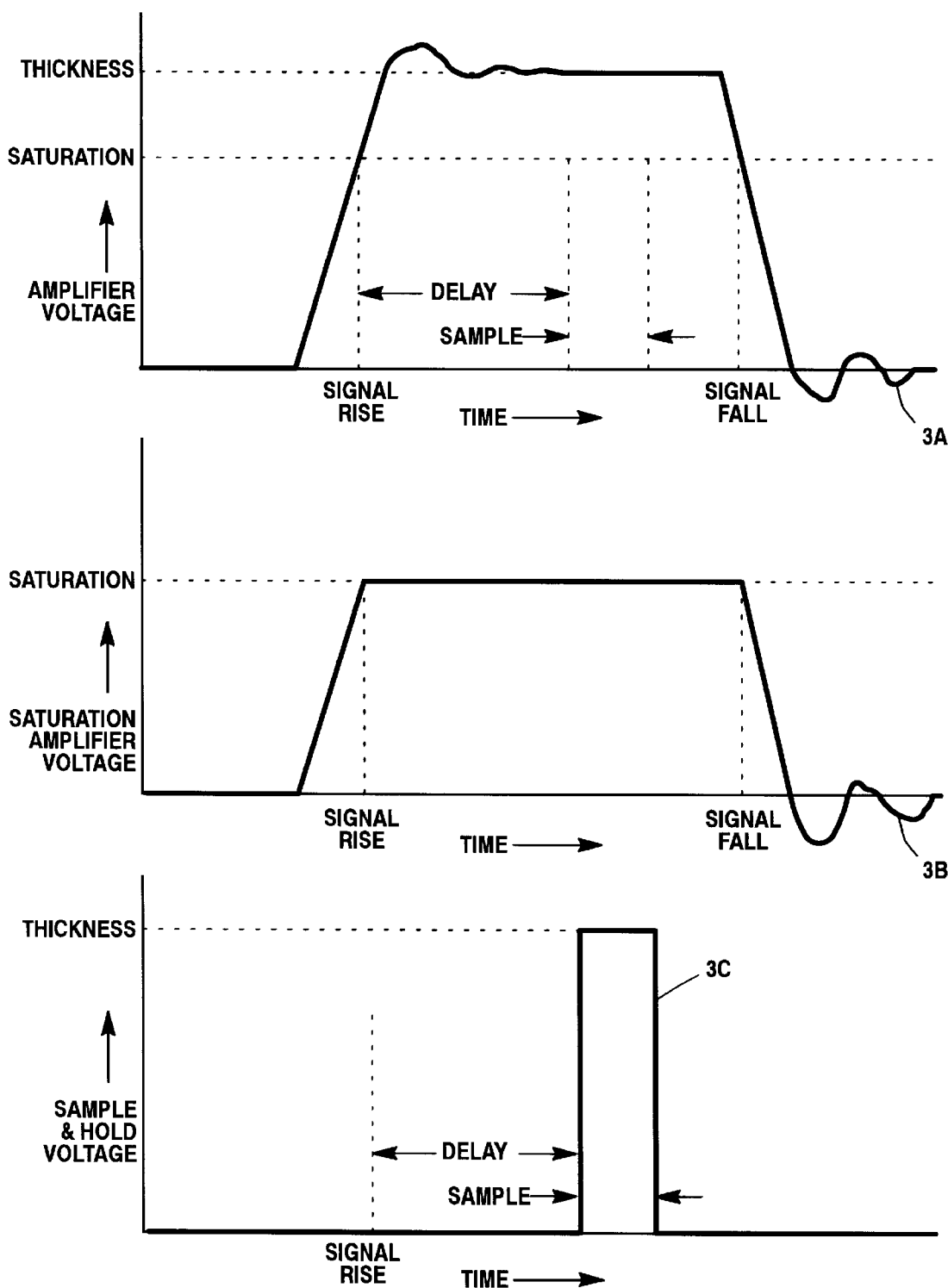

FIG. 2 is a block diagram example of a preferred electrical system to implement the foregoing arm-shift detector arrangement. Typically, electrical output from such a sensor transducer is rather small in amplitude; so, this signal is, here, amplified to produce larger signals that can be readily used by other circuitry. Such amplifiers (e.g., A, FIG. 2) are commonly known by those familiar with the state of the art. A typical example is the operational amplifier.

The top curve 3A in FIG. 3 is an example of the amplifier output voltage versus time signal produced at A when a document passes through the nip. The amplified transducer output is then sent to two circuits: a saturation amplifier A' and a signal delay circuit DL.

The saturation amplifier A' produces an output signal (see curve 3B) which remains a constant so long as the input signal remains greater than, or equal to, the desired output signal. Again, an operational amplifier is an example of a device than can be adapted to accomplish this function. Such devices are well known to those familiar with the electronic arts. The saturation voltage is set so that it is less than the anticipated minimum thickness of the documents being used. Curve 3B is shown as an example of such saturated amplifier output voltage plotted versus time. The saturated signal output is then sent to both a signal rise detection circuit (DD-r, FIG. 2) and a signal fall detection circuit (DD-f). Such circuits are designed to detect a change in signal level and to responsively output a digital signal (e.g., Up or Down) indicating a change in status. Again, such circuits are well known to those familiar with the electronic arts.

The signal delay circuit DL delays the transducer amplifier signal until after it has "settled" to a (nearly) constant value. This is preferably used because the initial engagement of a document edge with the nip of the roller pair in FIG. 1 can cause transient vibratory motions of the idler roller/arm array, and such vibrations would be detected by the arm transducer. It is desired to avoid this transient vibratory signal when making a document thickness measurement. Such a signal delay can be effected by any of several well known circuits, such as a transistor switch which is turned on by a clock counter circuit after a preset number of counts. Such circuits are well known to those familiar with the electronic arts. The delay time is set to be greater than the "settle-time" for idler pinch roller i-R (i.e., to allow transient motion to die-out), but less than the anticipated exit-time (i.e., the remaining time when the document will still be in the nip). This "exit-time" will be a function of document transport speed and document length. The signal delay circuit is initiated by the "signal rise" detection output detected at DD-r.

The delayed transducer amplifier signal is next sent to a sample and hold circuit S/H which holds the portion of the signal that is suitable for thickness measurement. Curve 3C in FIG. 3 is an example of such a sample and hold signal plotted versus time. Again, such circuits are well known to those familiar with the electronic arts. The sample and hold circuit output is fed to an analog to digital converter A/D, a circuit which is well known to those familiar with the electronic arts. The sample and hold circuitry can be reset after a suitable time period with an appropriate timer.

The signal rise, signal fall, and digital thickness signals are all sent to digital logic circuitry CP (e.g., a computer, such as a microprocessor). This data, together with a clock signal CL that normally is employed with computer logic circuitry, can be used to compute document length, (e.g., with an estimated document weight when document heights are known to be essentially uniform), or interdocument spacing, or document-location in the transport path—e.g., for those cases where there are multiple pinch rollers along the document track in a system, etc.

After suitable manipulation of this information, the digital logic (computer CP) sends corresponding electrical signals (see Out) to other utilization devices.

Preferred Example, FIG. 4.

FIG. 4 illustrates an example of a preferred implementation (e.g., idler roller arm, transducer). Here, idler pinch roller L-R' is rotateably connected to one end of a roller shaft L-R-S through a ball bearing bb. The other end of roller shaft L-R-S is fixed to one end of steel arm aa'. The other end of steel arm aa' is rotateably connected to one end of a pivot shaft PS' through a ball bearing bb'. The other end of pivot shaft PS' is fixed to the base (not shown). A compression spring SP is mounted between steel arm aa' and one end of a related spring bracket Br. The other end of the bracket is fixed to the base. Compression spring SP exerts a force on arm aa' which attempts to rotate it so that idler pinch roller L-R' is urged towards the driven pinch roller (not shown in FIG. 4, but appears in FIG. 1).

Here, the sensor-transducer consists of a coil cw of wire mounted from the base, but in proximity to steel arm aa'. An alternating voltage source AC is applied to an electrical circuit consisting of this coil, and a resistor r in series with the coil. This produces a magnetic field in the vicinity of the coil. The inductance of such a coil is affected by material that is within the magnetic field, so as steel arm aa' is moved into, or away from, the magnetic field, the inductance of coil cw changes. This changes the reactance (equivalent of AC resistance) of the coil. More or less voltage is then dropped across the series resistor r. This change in voltage is then measured (e.g., at SM) as representing ar displacement m. (Magenetic phonograph needles are an example of this kind of transducer.) The alternating voltage can be converted to a direct voltage, well known to those familiar with electronics and is suitable for the transducer electronics illustrated in FIG. 2. SM may comprise AC voltage measuring means known in the art.

Sensor-transducer cw can be calibrated by placing a material of known thickness in the nip between the drive and idler pinch rollers, as workers will appreciate.

Examples of other devices for using this invention are document printers, smart diverter gate actuation controllers, display devices that give information about the status of documents in the transport system, other computers that further process document size information, jam detection circuitry, document slip detection circuitry, etc.

In conclusion, it will be understood that the preferred embodiments described herein are only exemplary, and that the invention is capable of many modifications and variations in construction, arrangement and use without departing from the spirit of the claims.

For example, the means and methods disclosed herein are also applicable to other related document transport arrangements. Also, the present invention is applicable for monitoring other mounting arrangements.

The above examples of possible variations of the present invention are merely illustrative. Accordingly, the present invention is to be considered as including all possible modifications and variations coming within the scope of the invention as defined by the appended claims.

What is claimed is:

1. An apparatus for generating a signal indicating a thickness of a document moving along a track, the apparatus comprising:

a driven pinch roller positioned in fixed relation to the track;

an idler pinch roller positioned in opposing relation to the driven pinch roller, the idler pinch roller being movable relative to the driven pinch roller;

an arm having a first end and a second end, the idler pinch roller being pivotally joined to the first end, the second end being configured as a pivot point for the arm;

means for urging the idler pinch roller toward the driven pinch roller, the urging means being overcome by a thickness of a document disposed in the track between the idler pinch roller and the driven pinch roller to displace the idler pinch roller from the driven pinch roller by a displacement corresponding to a thickness of the document;

a transducer communicating with the arm to sense the displacement of the arm and to generate an output signal corresponding to the displacement;

wherein the transducer includes an AC voltage source, a coil, a resistor, and an AC voltage-measuring instrument, the coil and the resistor being coupled in series across the AC voltage source, the AC voltage-measuring instrument being coupled to measure the voltage across the resistor, the coil having an inductance and generating a magnetic field when energized by the AC voltage source, and the voltage across the resistor being dependent on the inductance of the coil;

wherein the arm is formed of steel and is movable relative to the coil to affect the magnetic field generated by the coil, thereby affecting the voltage across the resistor; and whereby the voltage across the resistor corresponds to the displacement of the arm resulting from the thickness of the document.

* * * * *